(12) United States Patent
Ibrahim et al.

(10) Patent No.: US 12,479,720 B1
(45) Date of Patent: Nov. 25, 2025

(54) METHOD OF HYDROGEN GENERATION THROUGH SODIUM BOROHYDRIDE HYDROLYSIS USING $CaV_2O_6@CaSiO_3@g-C_3N_4$ NANOCOMPOSITE

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Mohamed Khairy Omran, Riyadh (SA); Babiker Yagoub Elhadi Abdulkhair, Riyadh (SA); Faisal K. Algethami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/267,136

(22) Filed: Jul. 11, 2025

(51) Int. Cl.
| | |
|---|---|
| *C01B 3/04* | (2006.01) |
| *B01J 21/18* | (2006.01) |
| *B01J 23/02* | (2006.01) |
| *B01J 35/63* | (2024.01) |
| *B01J 35/64* | (2024.01) |
| *B01J 37/04* | (2006.01) |
| *B01J 37/34* | (2006.01) |

(52) U.S. Cl.
CPC ............ *C01B 3/04* (2013.01); *B01J 21/18* (2013.01); *B01J 23/02* (2013.01); *B01J 35/633* (2024.01); *B01J 35/647* (2024.01); *B01J 37/04* (2013.01); *B01J 37/346* (2013.01); *C01B 2203/1082* (2013.01)

(58) Field of Classification Search
CPC .................... C01B 3/04; B01J 21/18
See application file for complete search history.

(56) References Cited

U.S. PATENT DOCUMENTS

2014/0076043 A1 * 3/2014 Bognar ............... B64B 1/62
73/170.28

FOREIGN PATENT DOCUMENTS

| CN | 111250127 B | 1/2023 | |
|---|---|---|---|
| CN | 115786933 B | 8/2024 | |
| JP | 2007-326742 | * 12/2007 | ............ Y02E 60/36 |
| JP | 2012-161738 A | 8/2012 | |

OTHER PUBLICATIONS

Translation of JP 2007-326742 (Year: 2007).*
Luis Ernesto Arteaga-Pérez, et al., "Technological evaluation of a Co—SiO2 and Cu—CaSiO3 as catalysts for the hydrogen production using ethanol. Reaction mechanism and kinetics of the ionic adsorption", Afinida-Barcelona—66(543), Sep. 2009, pp. 398-402 (abstract only, 2 pgs).

* cited by examiner

*Primary Examiner* — Paul A Wartalowicz
(74) *Attorney, Agent, or Firm* — Oblon, McClelland, Maier & Neustadt, L.L.P.

(57) ABSTRACT

A method of generating hydrogen includes contacting a graphite-phase carbon nitride, calcium metavanadate and calcium silicate ($CaV_2O_6@CaSiO_3@g-C_3N_4$) nanocomposite with sodium borohydride ($NaBH_4$) in water and hydrolyzing the sodium borohydride to generate hydrogen.

20 Claims, 5 Drawing Sheets

METHOD OF HYDROGEN GENERATION THROUGH SODIUM BOROHYDRIDE HYDROLYSIS USING $CaV_2O_6$@$CaSiO_3$@g-$C_3N_4$ NANOCOMPOSITE

BACKGROUND

Technical Field

The present disclosure is directed towards a method for hydrogen generation, more particularly, to a method of hydrogen generation using a graphite-phase carbon nitride, calcium metavanadate and calcium silicate ($CaV_2O_6$@$CaSiO_3$@g-$C_3N_4$) nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The rapid depletion of fossil fuel sources and a notable increase in atmospheric $CO_2$ emissions are the result of increasing energy demands. Hence, switching to renewable sources of energy has gained a considerable attention due to greater replenishable ability and minimal hazardous emissions associated with its usage. Additionally, it promises a more sustainable and ecologically friendly future since it eliminates the demand of carbon-intensive fossil fuels which governs the suppression of resultant carbon emissions. As a result, this approach helps in tackling various environmental issues such as pollution and global warming. In summary, advancement towards clean energy is beneficial for overall sustainable growth and development.

Among renewable sources, hydrogen has emerged as one of the most striking energy carriers due to its high energy density (142 megajoules per kilogram (MJ/kg)), non-toxicity, and environmental friendliness characteristics. Notably, the energy density (142 MJ/kg) of hydrogen is higher than liquid hydrocarbons' energy density of 47 MJ/kg. In addition, different forms of hydrogen can easily be stored using different storage techniques, such as in carbon-based materials as molecules, in metal hydrides as atoms, in borohydrides as anions, in pressure vessels, and in liquid hydrogen tanks. However, high cylinder investments and maintenance costs, high gas compression energy consumption, and easy gas leakage at high pressure are primary disadvantages associated with high-pressure hydrogen storage and liquefaction. Additionally, the use of metal hydrides for hydrogen storage has been limited due to their high temperature requirements and air sensitivity for hydrogen generation by thermal breakdown. However, other benefits such as high hydrogen storage capacity, excellent thermal and chemical stability, perfect hydrolysis controllability, and the environmentally friendly nature of the reaction products, could not be neglected. Borohydrides, specifically, sodium borohydride ($NaBH_4$)—is regarded as the appropriate choice for on-demand hydrogen production. Reports indicate that hydrolysis of $NaBH_4$ enhances significantly by use of noble metals as catalysts [Tianhao Wang; Jiashun Xi; Hang Sheng; Yi Zhao. Mechanism of catalytic performance enhancement for hydrolysis of sodium borohydride by modification of cobalt boride with metals: A review. *Int. J. Hydrogen Energy* 2024, 85, 120-134; Hehui Wang; Fen Xu; Lixian Sun; Jinfan Wu; Guorong Zhang; Yanling Zhu, Qiwei Shao, Yong Luo; Yijie Wang; Yuan Gao; Yongjin Zou. Novel MOF/COF dual carrier anchoring Ru nanoparticles for improved hydrogen production by hydrolysis of $NaBH_4$. *J. Alloys Compd.* 2024, 978, 173415; and A. G. Abd-Elrahim; Doo-Man Chun; E. M. M. Ibrahim; Faisal K. Algethami; Mohamed Nady Goda; Manar A. Ali. Sonochemical synthesis of mesoporous $Zn_yCd_{1-y}$S quantum dots: Composition-dependent optical, electrical, dielectric, and hydrogen-generation characteristics. *J. Phys. Chem. Solids* 2025, 197, 112414]. However, high price of metals and rarity of precious metals significantly restrict their practical utilization. Therefore, researchers presently aim to use transition metals for the preparation of catalysts.

Accordingly, it is one object of the present disclosure to provide a method for hydrogen generation, that may overcome the drawbacks of prior art.

SUMMARY

In an exemplary embodiment, a method for hydrogen generation is described. The method includes contacting a graphite-phase carbon nitride, calcium metavanadate and calcium silicate ($CaV_2O_6$@$CaSiO_3$@g-$C_3N_4$) nanocomposite with sodium borohydride ($NaBH_4$) in water; and hydrolyzing the sodium borohydride to generate hydrogen.

In some embodiments, the sodium borohydride is present in an amount of 0.5 to 1 g per 0.4 mg of the $CaV_2O_6$@$CaSiO_3$@g-$C_3N_4$ nanocomposite.

In some embodiments, the $CaV_2O_6$@$CaSiO_3$@g-$C_3N_4$ nanocomposite is present in an amount of 3.5 to 4.5 milligrams (mg) per 700 mg of the borohydride.

In some embodiments, the method of contacting $CaV_2O_6$@$CaSiO_3$@g-$C_3N_4$ nanocomposite occurs at a temperature of 20 to 45 degrees Celsius (° C.).

In some embodiments, the hydrogen is generated at a hydrogen generation rate of 2200 to 2400 milliliters per minute (mL/min) per gram of $CaV_2O_6$@$CaSiO_3$@g-$C_3N_4$ nanocomposite at a temperature of 35 to 40° C.

In some embodiments, the method of hydrolyzing the sodium borohydride generates at least 10 milliliters (mL) hydrogen within 2 minutes at a temperature of 35 to 40° C.

In some embodiments, the method of hydrolyzing the sodium borohydride generates at least 30 mL hydrogen within 3 minutes at a temperature of 35 to 40° C.

In some embodiments, the method of hydrolyzing the sodium borohydride generates at least 45 mL hydrogen within 5 minutes at a temperature of 35 to 40° C.

In some embodiments, the hydrogen is generated at a hydrogen generation rate of 300 to 400 mL/min per gram of $CaV_2O_6$@$CaSiO_3$@g-$C_3N_4$ nanocomposite at a temperature of 25 to 30° C.

In some embodiments, the method of hydrolyzing the sodium borohydride generates at least 5 mL hydrogen within 2 minutes at a temperature of 25 to 30° C.

In some embodiments, the method of hydrolyzing the sodium borohydride generates at least 21 mL hydrogen within 5 minutes at a temperature of 25 to 30° C.

In some embodiments, the method of hydrolyzing the sodium borohydride generates at least 43 mL hydrogen within 10 minutes at a temperature of 25 to 30° C.

In some embodiments, the method of hydrolyzing the sodium borohydride at a temperature of 35 to 40° C. has a hydrogen generation rate that is 8 to 11 times faster than the hydrolyzing without contacting with the $CaV_2O_6$@$CaSiO_3$@g-$C_3N_4$ nanocomposite.

In some embodiments, the method of hydrolyzing the sodium borohydride at a temperature of 25 to 30° C. has a hydrogen generation rate that is 4 to 6 times faster than the hydrolyzing without contacting with the $CaV_2O_6@CaSiO_3@g-C_3N_4$ nanocomposite.

In some embodiments, the $CaV_2O_6@CaSiO_3@g-C_3N_4$ nanocomposite includes a graphite-phase carbon nitride ($g-C_3N_4$) in an amount of 20 to 40 percent by weight (wt. %), calcium silicate ($CaSiO_3$) in an amount of 20 to 40 wt. %, and calcium metavanadate ($CaV_2O_6$) in an amount of 20 to 40 wt. %, based on a total weight of the $CaV_2O_6/CaSiO_3/g-C_3N_4$ nanocomposite.

In some embodiments, the $CaV_2O_6@CaSiO_3@g-C_3N_4$ nanocomposite is porous, and has an average pore diameter of 2 to 16 nanometers (nm).

In some embodiments, the $CaV_2O_6@CaSiO_3@g-C_3N_4$ nanocomposite is porous, and has a pore volume to 0.2 to 0.24 cubic centimeters per gram ($cm^3g^{-1}$).

In some embodiments, the $CaV_2O_6@CaSiO_3@g-C_3N_4$ nanocomposite includes a major $CaV_2O_6$ phase, a major $CaSiO_3$ phase, and a minor $g-C_3N_4$ phase. The $CaV_2O_6$ phase and the $CaSiO_3$ phase are in a structure of nanowires, and the $g-C_3N_4$ phase is in a structure of nanosheets, and the nanowires are dispersed in between the nanosheets.

In some embodiment, the $CaV_2O_6@CaSiO_3@g-C_3N_4$ nanocomposite has $g-C_3N_4$ nanosheets with an interplanar spacing of 0.13 to 0.25 nm.

In another exemplary embodiment, a method of producing a $CaV_2O_6@CaSiO_3@g-C_3N_4$ nanocomposite is described. The method includes mixing a calcium salt and a metasilicate salt in a solvent to form a silicate product, followed by heating urea to form $g-C_3N_4$ product, and heating ammonium metavanadate with xylose in nitric acid to form vanadate product and finally microwaving the silicate product, the $g-C_3N_4$ product, and the vanadate product in an organic solvent to form the $CaV_2O_6@CaSiO_3@g-C_3N_4$ nanocomposite.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, and mixtures thereof.

As used herein, the term 'particulate' refers to small, discrete particles that are suspended in a medium, such as air, water, or a solid matrix. These particles can vary in size, shape, and composition and are often categorized based on their dimensions, such as nanoparticles (1-100 nm) or microparticles (1-1000 micrometer (μm)).

As used herein, the term 'crystalline' refers to a material or substance in which atoms, ions, or molecules are arranged in a highly ordered, repeating pattern extending in three dimensions. This regular atomic structure gives crystalline materials distinct properties, such as well-defined geometric shapes, sharp melting points, and characteristic optical and electrical behaviors.

As used herein, the term 'nanocomposite' refers to a composite material that has at least one component with a grain size measured in nanometers (nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

As used herein, the term 'XRD' refers to X-ray diffraction, a scientific technique used to study the structure of materials. It is commonly used to identify the crystalline phases of a substance, crystal structure, and to analyze the arrangement of atoms within a material.

As used herein, the term 'BET' refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term 'surface area' refers to the total area of the surface of a material that is available for interaction with its environment. It is a measure of the extent of a material's surface exposed to external conditions, which can be important in determining the material's reactivity, adsorption capacity, or other surface-related properties.

As used herein, the term 'mesoporous' refers to a type of material that contains pores (voids or spaces) with diameters typically ranging from 2 to 50 nm. These pores are intermediate in size between micropores (less than 2 nm) and macropores (greater than 50 nm).

As used herein, the term 'transmission electron microscopy (TEM)' refers to a microscopy technique that utilizes a beam of electrons transmitted through a thin sample to form an image.

TEM provides high-resolution imaging at the nanometer or even atomic scale, allowing the observation of the internal structure of materials. This method is widely used to examine the morphology, crystallography, and composition of nanoparticles, materials, and biological specimens, offering detailed insights into their microstructure.

As used herein, the term 'hydrogen generation rate (HGR)' is the amount of hydrogen produced per unit time, typically expressed in moles per minute (min) or milliliters per minute.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of nitrogen include $^{14}N$ and $^{15}N$. Isotopes of Ca include $^{40}Ca$, $^{42}Ca$, $^{43}Ca$, $^{44}Ca$, and $^{46}Ca$. Isotopes of silicon include $^{28}Si$, $^{29}Si$, and $^{30}Si$. Isotopes of hydrogen include $^{1}H$, $^{2}H$, and $^{3}H$. Isotopes of vanadium include $^{50}V$ and $^{51}V$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a $CaV_2O_6$@$CaSiO_3$@g-$C_3N_4$ nanocomposite designed to function as a catalyst to enhance the hydrolysis of sodium borohydride ($NaBH_4$) for efficient production of hydrogen gas. The catalyst facilitates the safe and rapid release of hydrogen from $NaBH_4$, making it an efficient solution for clean hydrogen production.

In some embodiments, the $CaV_2O_6$@$CaSiO_3$@g-$C_3N_4$ nanocomposite includes a graphite-phase carbon nitride (g-$C_3N_4$) in an amount of 20 to 40 percent by weight (wt. %), preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6$@$CaSiO_3$@g-$C_3N_4$ nanocomposite. In a preferred embodiment, the $CaV_2O6$@$CaSiO_3$@g-$C_3N_4$ nanocomposite includes a graphite-phase carbon nitride (g-$C_3N_4$) in an amount of 33.3 wt. % based on the total weight of the nanocomposite.

In some embodiments, the $CaV_2O_6$@$CaSiO_3$@g-$C_3N_4$ nanocomposite includes calcium silicate ($CaSiO_3$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on a total weight of the $CaV_2O_6$@$CaSiO_3$@g-$C_3N_4$ nanocomposite. In a preferred embodiment, the $CaV_2O_6$@$CaSiO_3$@g-$C_3N_4$ nanocomposite includes calcium silicate ($CaSiO_3$) in an amount of 33.3 wt. % based on the total weight of the nanocomposite.

In some embodiments, the $CaV_2O_6$@$CaSiO_3$@g-$C_3N_4$ nanocomposite includes calcium metavanadate ($CaV_2O_6$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on a total weight of the $CaV_2O_6$@$CaSiO_3$@g-$C_3N_4$ nanocomposite. In a preferred embodiment, the $CaV_2O_6$@$CaSiO_3$@g-$C_3N_4$ nanocomposite includes an equal mass of $CaSiO_3$, g-$C_3N_4$, and $V_2O_5$, based on a total weight of the $CaV_2O_6$@$CaSiO_3$@g-$C_3N_4$ nanocomposite. In a preferred embodiment, the $CaV_2O_6$@$CaSiO_3$@g-$C_3N_4$ nanocomposite includes calcium metavanadate ($CaV_2O_6$) in an amount of 33.3 wt. % based on the total weight of the nanocomposite.

In some embodiments, the $CaV_2O_6@CaSiO_3@g-C_3N_4$ nanocomposite includes a major $CaV_2O_6$ phase, a major $CaSiO_3$ phase, and a minor $g-C_3N_4$ phase. In some embodiments, the $CaV_2O_6$ phase and the $CaSiO_3$ phase are in a structure of nanowires, and the $g-C_3N_4$ phase is in a structure of nanosheets. In some embodiments, the nanowires are dispersed between the nanosheets.

In some embodiments, the nanocomposite may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, and mixtures thereof.

In a preferred embodiment, the $CaV_2O_6@CaSiO_3@g-C_3N_4$ nanocomposite is porous, and has slit-shaped pores. In a preferred embodiment, the two-dimensional porous structure of $CaV_2O_6@CaSiO_3@g-C_3N_4$ nanocomposite is constructed with curled and wrinkled nanosheets and platelets of the $g-C_3N_4$. In a preferred embodiment, the $CaV_2O_6@CaSiO_3@g-C_3N_4$ nanocomposite consists of homogeneous nanowires of metal oxides on nanosheets of $g-C_3N_4$.

In some embodiments, the graphitic $C_3N_4$ in the nanocomposite consists of sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible.

In some embodiments, the homogeneous nanowires of metal oxides, on nanosheets of $g-C_3N_4$, has an average length in the range of from 50 to about 150 nanometers (nm), preferably 55 to 145 nm, preferably 60 to 140 nm, preferably 65 to 135 nm, preferably 70 to 130 nm, preferably 75 to 125 nm, preferably 80 to 120 nm, preferably 85 to 125 nm, and preferably 90 to 120 nm, as determined using TEM. In a preferred embodiment, the homogeneous nanowires of metal oxides have an average length of 90.6 nm on nanosheets of $g-C_3N_4$, as determined using TEM.

In some embodiments, the $CaV_2O_6@CaSiO_3@g-C_3N_4$ nanocomposite has $g-C_3N_4$ nanosheets with an interplanar spacing of 0.13 to 0.25 nm, preferably 0.135 to 0.245 nm, preferably 0.140 to 0.240 nm, preferably 0.145 to 0.235 nm. In a preferred embodiment, the $CaV_2O_6@CaSiO_3@g-C_3N_4$ nanocomposite has $g-C_3N_4$ nanosheets with an interplanar spacing of 0.23 nm, 0.219 nm, 0.17 nm, and 0.146 nm, as determined by SAED analysis. In a preferred embodiment, the nanocomposite has an interplanar spacing of 0.23 nm, 0.219 nm, 0.17, and 0.146 nm due to (003, $CaV_2O_6$), (−231, $CaSiO_3$) and (003, $CaV_2O_6$), diffraction planes, respectively.

The Brunauer-Emmett-Teller (BET) hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the $CaV_2O_6@CaSiO_3@g-C_3N_4$ nanocomposite has a Brunauer-Emmett-Teller (BET) surface area of 50 to 65 square meter per gram ($m^2g^{-1}$), preferably 50.5 to 64.5 $m^2g^{-1}$, preferably 51.0 to 64.0 $m^2g^{-1}$, preferably 51.5 to 63.5 $m^2g^{-1}$, preferably 52.0 to 63.0 $m^2g^{-1}$, preferably 52.5 to 62.5 $m^2g^{-1}$, preferably 53.0 to 62.0 $m^2g^{-1}$, preferably 53.5 to 61.5 $m^2g^{-1}$, preferably 54.0 to 61.0 $m^2g^{-1}$, preferably 54.5 to 60.5 $m^2g^{-1}$, preferably 55.0 to 60.0 $m^2g^{-1}$, preferably 55.5 to 59.5 $m^2g^{-1}$, preferably 56.0 to 59.0 $m^2g^{-1}$, preferably 56.5 to 58.5 $m^2g^{-1}$, and preferably 57.0 to 58.0 $m^2g^{-1}$. In a preferred embodiment, the $CaV_2O_6/CaSiO_3/g-C_3N_4$ nanocomposite has a Brunauer-Emmett-Teller (BET) surface area of 57.02 $m^2g^{-1}$.

A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In some embodiments, the $CaV_2O_6@CaSiO_3@g-C_3N_4$ nanocomposite is porous and the pores are in the form of slits.

In some embodiments, the average pore distribution of the nanocomposite as determined by Barrett-Joyner-Halenda (BJH) desorption analysis desorption analysis may include, but is not limited to, crystalline average pore distribution, bimodal, trimodal, multimodal, narrow, broad, and Gaussian. In a preferred embodiment, the crystalline nanocomposite has a multimodal pore size distribution, as determined by BJH desorption analysis.

In some embodiments, the nanocomposite has a trimodal pore size distribution, as determined by Barrett-Joyner-Halenda (BJH) desorption analysis. The term "trimodal pore size distribution" refers to the material's pore structure in BET (Brunauer-Emmett-Teller) analysis. In a trimodal distribution, the porous materials contain significant populations of pores in three different size ranges. A porous material, with trimodal distribution, has pores of different sizes like micropores (approximately 1.5 nm), mesopores (2-50 nm) and macropores (greater than 50 nm). This type of pore structure enhances properties like adsorption, permeability, and diffusion, making it ideal for applications in catalysis, gas separation, and filtration. Micropores provide a high surface area, mesopores allow molecule diffusion, and macropores facilitate bulk transport. Different pore sizes have the possibility to maximize surface area and facilitate mass transport. Compared to unimodal or bimodal distributions, trimodal materials offer a wide variety performance associated with porosity, which is important for material functionality in various industrial and scientific applications.

In some embodiments, the $CaV_2O_6@CaSiO_3@g-C_3N_4$ nanocomposite is porous, and has an average pore diameter of 2 to 16 nm, preferably 2.5 to 15.5 nm, preferably 3.0 to 15.0 nm, and preferably 3.5 to 14.5 nm. In a preferred embodiment, the $CaV_2O_6@CaSiO_3@g-C_3N_4$ nanocomposite is porous, and has an average pore diameter maximized at 4.3 nm, 8.5 nm, and 14.27 nm.

In some embodiments, the $CaV_2O_6@CaSiO_3@g-C_3N_4$ nanocomposite is porous, and has a pore volume of 0.2 to 0.24 cubic centimeters per gram ($cm^3g^{-1}$), preferably 0.205 to 0.245 $cm^3g^{-1}$, preferably 0.210 to 0.240 $cm^3g^{-1}$, preferably 0.215 to 0.235 $cm^3g^{-1}$, and preferably 0.220 to 0.230 $cm^3g^{-1}$. In a preferred embodiment, the $CaV_2O_6@CaSiO_3@g-C_3N_4$ nanocomposite is porous, and has a pore volume of 0.22 $cm^3 \cdot g^1$.

In some embodiments, the nanocomposite has a hysteresis loop of Type H3 (international union of pure and applied chemistry (IUPAC) classification), as determined by $N_2$ adsorption-desorption analysis. In BET nitrogen adsorption-desorption analysis, hysteresis loops provide insight into the pore structure of materials. The H1 hysteresis loop is typically associated with materials having uniform, cylindrical mesopores, indicating a well-ordered and open porous structure. The H2 loop indicates the presence of complex pore geometries such as ink-bottle pores, where narrow necks are connected to wider cavities, often indicating pore blocking or restricted diffusion. The H3 hysteresis loop is common in materials composed of plate-like particles, such as layered or sheet-like structures, and reflects the presence of slit-shaped mesopores without pore filling at high relative pressures. Lastly, the H4 loop is similar to H3 but generally indicates narrower slit-like pores and often points to a combination of micro- and mesoporosity, commonly observed in more compact or disordered porous solids. In some embodiments, the nanocomposite may have a hysteresis loop of Type H4, H2, and H1.

In another aspect, a method of hydrogen production is described. The method includes reacting a borohydride with water in the presence of the nanocomposite to hydrolyze the borohydride and generate hydrogen. The present disclosure circumvents the drawbacks of prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The use of a particulate crystalline nanocomposite catalyst demonstrated excellent catalytic performance for the hydrolysis of $NaBH_4$, resulting in the generation of clean hydrogen rapidly and efficiently under green conditions. This method, with a high hydrogen generation rate (HGR), highlights its strong possibility for energy storage and environmental applications.

In some embodiments, the hydrogen is generated at a hydrogen generation rate of 2200 to 2400 milliliters per min per gram (mL $min^{-1}g^{-1}$), preferably 2220 to 2380 mL $min^{-1}g^{-1}$, preferably 2240 to 2360 mL $min^{-1}g^{-1}$, preferably 2260 to 2340 mL $min^{-1}g^{-1}$, and preferably 2280 to 2320 mL $min^{-1}g^{-1}$, of $CaV_2O_6@CaSiO_3@g-C_3N_4$ nanocomposite at a temperature of 35° to 40° C., preferably 35.5° to 39.5° C., preferably 36.0° to 39.0° C., and preferably 36.5° to 38.5° C. In a preferred embodiment, hydrogen is generated at a hydrogen generation rate of 2312.5 mL $min^{-1}$ $g^{-1}$ of the $CaV_2O_6@CaSiO_3@g-C_3N_4$ nanocomposite at a temperature of 38° C.

In some embodiments, the hydrogen is generated at a hydrogen generation rate of 300 to 400 mL $min^{-1}g^{-1}$, preferably 305 to 395 mL $min^{-1}g^{-1}$, preferably 310 to 390 mL $min^{-1}g^{-1}$, preferably 315 to 385 mL $min^{-1}g^{-1}$, preferably 320 to 380 mL $min^{-1}g^{-1}$, preferably 325 to 375 mL $min^{-1}g^{-1}$, and preferably 330 to 370 mL $min^{-1}g^{-1}$, of $CaV_2O_6@CaSiO_3@g-C_3N_4$ nanocomposite at a temperature of 25° to 30° C., preferably 25.5° to 29.5° C., preferably 26.0° to 29.0° C., and preferably 26.5° to 28.5° C. In a preferred embodiment, hydrogen is generated at a hydrogen generation rate of 367.5 mL $min^{-1}g^{-1}$ of the $CaV_2O_6@CaSiO_3@g-C_3N_4$ nanocomposite at a temperature of 28° C.

Figure 1A:
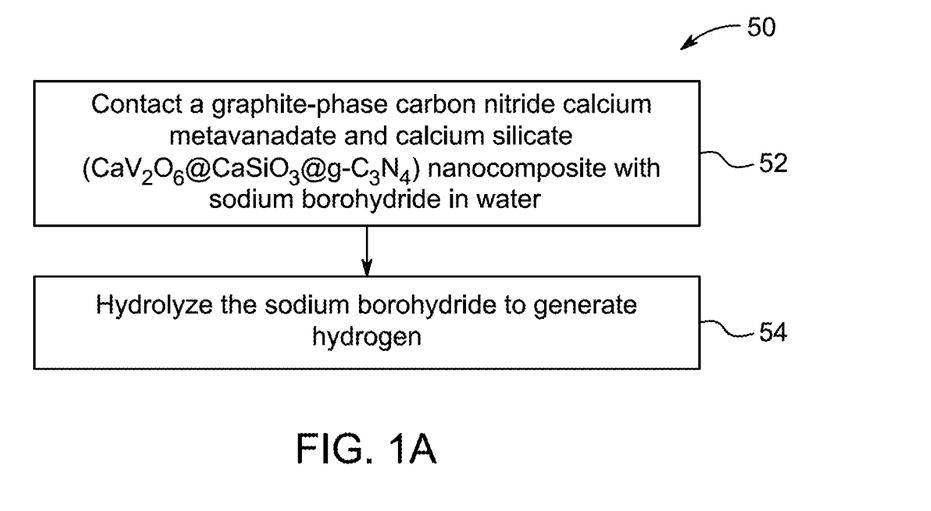
FIG. 1A is an exemplary flowchart of a method of hydrogen generation using $CaV_2O_6@CaSiO_3@g-C_3N_4$ nanocomposite, according to certain embodiments.

FIG. 1A illustrates a schematic flow chart of a method 50 of hydrogen generation. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting a graphite-phase carbon nitride calcium metavanadate and calcium silicate ($CaV_2O_6@CaSiO_3@g-C_3N_4$) nanocomposite with sodium borohydride in water. In some embodiments, other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof may also be used. In a preferred embodiment, sodium borohydride is used for hydrogen generation.

In some embodiments, the water may be tap water, distilled water, bi-distilled water, deionized water, deionized distilled water, reverse osmosis water, hard water, fresh water, brine/salt water, the hard water, and the freshwater may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the sodium borohydride is present in an amount of 0.5 to 1 g per 0.4 mg, preferably 0.55 to 0.95 mg per 0.4 mg, preferably 0.60 to 0.90 mg per 0.4 mg, and preferably 0.65 to 0.85 mg per 0.4 mg, of the $CaV_2O6@CaSiO_3@g-C_3N_4$ nanocomposite. In a preferred embodiment, the sodium borohydride is present in an amount of 0.7 g per 0.4 mg of the $CaV_2O_6@CaSiO_3@g-C_3N_4$ nanocomposite.

In some embodiments, the $CaV_2O6@CaSiO_3@g-C_3N_4$ nanocomposite is present in an amount of 3.5 to 4.5 mg per 700 mg, preferably 3.6 to 4.4 mg per 700 mg, preferably 3.7 to 4.3 mg per 700 mg, preferably 3.8 to 4.2 mg per 700 mg, and preferably 3.9 to 4.1 mg per 700 mg, of the borohydride. In a preferred embodiment, the $CaV_2O6@CaSiO_3@g-C_3N_4$ nanocomposite is present in an amount of 4.0 mg per 700 mg of the borohydride.

In some embodiments, the method of contacting the $CaV_2O_6@CaSiO_3@g-C_3N_4$ nanocomposite with sodium borohydride occurs at a temperature of 20 to 45° C., preferably 21° C. to 44° C., preferably 22° C. to 43° C., preferably 23° C. to 42° C., preferably 24° C. to 41° C., preferably 25° C. to 40° C., and preferably 26° C. to 39° C. In a preferred embodiment, the method of contacting the nanocomposite with borohydride occurs at a temperature of 28° C. and 38° C.

At step 54, the method 50 includes hydrolyzing the sodium borohydride to generate hydrogen. In some embodiments, the method generates at least 10 mL, preferably at least 10.5 mL, preferably 11.0 mL, preferably 11.5 mL, and preferably 12.0 mL, of hydrogen within 2 minutes at a temperature of 35° C. to 40° C., preferably 35.5° C. to 39.5° C., preferably 36.0° C. to 39.0° C., and preferably 36.5° C. to 38.5° C.

In some embodiments, the method of the present disclosure generates at least 30 mL of hydrogen within 3 minutes at a temperature of 35° C. to 40° C., preferably 35.5° C. to 39.5° C., preferably 36.0° C. to 39.0° C., and preferably 36.5° C. to 38.5° C.

In some embodiments, the method of the present disclosure generates at least 45 mL of hydrogen within 5 minutes at a temperature of 35° C. to 40° C., preferably 35.5° C. to 39.5° C., preferably 36.0° C. to 39.0° C., and preferably 36.5° C. to 38.5° C.

In some embodiments, the method of the present disclosure generates at least 5 mL of hydrogen within 2 minutes at a temperature of 25° C. to 30° C., preferably 25.5° C. to 29.5° C., preferably 26.0° C. to 29.0° C., and preferably 26.5° C. to 28.5° C.

In some embodiments, the method of the present disclosure generates at least 21 mL of hydrogen within 5 minutes at a temperature of 25° C. to 30° C., preferably 25.5° C. to 29.5° C., preferably 26.0° C. to 29.0° C., and preferably 26.5° C. to 28.5° C.

In some embodiments, the method of the present disclosure generates at least 43 mL of hydrogen within 10 minutes at a temperature of 25° C. to 30° C., preferably 25.5° C. to 29.5° C., preferably 26.0° C. to 29.0° C., and preferably 26.5° C. to 28.5° C.

In some embodiments, the hydrogen generated via hydrolysis of sodium borohydride may have different rates of hydrogen generation in the presence and absence of the nanocomposite. In some embodiments, the method of hydrolyzing the sodium borohydride at a temperature of 35° C. to 40° C. has a hydrogen generation rate that is 8 to 11 times faster than the hydrolysis when performed without the $CaV_2O_6@CaSiO_3@g-C_3N_4$ nanocomposite.

In some embodiments, the method of hydrolyzing the sodium borohydride at a temperature of 25° C. to 30° C., preferably 25.5° C. to 29.5° C., preferably 26.0° C. to 29.0° C., and preferably 26.5° C. to 28.5° C., has a hydrogen generation rate that is 4 to 6 times faster than the hydrolyzing without contacting with the $CaV_2O_6@CaSiO_3@g-C_3N_4$ nanocomposite.

Figure 1B:
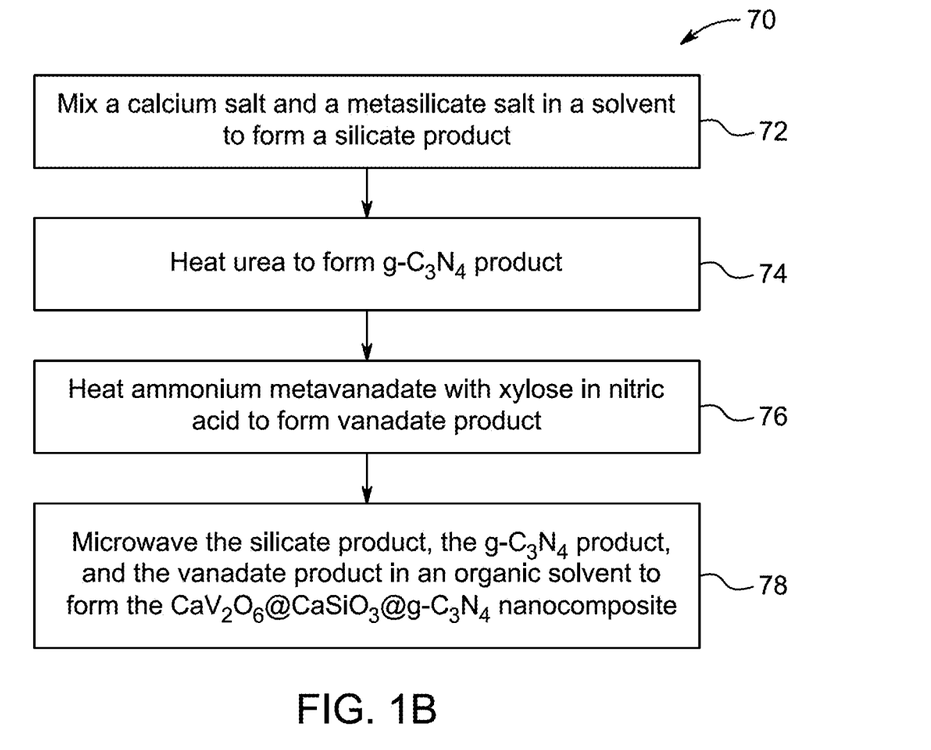
FIG. 1B is an exemplary flowchart of a method of producing $CaV_2O_6@CaSiO_3@g-C_3N_4$ nanocomposite, according to certain embodiments.

FIG. 1B illustrates a schematic flow chart of a method 70 of preparing the $CaV_2O_6@CaSiO_3@g-C_3N_4$ nanocomposite. The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes mixing a calcium salt and a metasilicate salt in a solvent to form a silicate product. In some embodiments, calcium salt may include, but is not limited to, calcium sulfate, calcium chloride, calcium oxide, calcium carbonate, calcium hydroxide, calcium bromide, calcium iodide, calcium acetate, calcium fluoride, calcium tartrate, calcium citrate, calcium stearate, calcium lactate, calcium gluconate, calcium salicylate, calcium perchlorate, calcium phosphate, calcium arsenate, calcium metaborate, calcium silicate, calcium molybdate, calcium tungstate, calcium chromate, calcium aluminate, calcium stannate, calcium titanate, calcium ferrocyanide, calcium pyrophosphate, and calcium benzoate. In a preferred embodiment, calcium salt is calcium nitrate ($Ca(NO_3)_2$).

In some embodiments, metasilicate salt may include, but is not limited to, lithium metasilicate, sodium metasilicate, potassium metasilicate, rubidium metasilicate, cesium metasilicate, calcium metasilicate, magnesium metasilicate, barium metasilicate, beryllium metasilicate, strontium metasilicate, zinc metasilicate, iron metasilicate, aluminium metasilicate, lead metasilicate, manganese metasilicate, cobalt metasilicate, chromium metasilicate, and cerium metasilicate In a preferred embodiment, metasilicate salt is sodium metasilicate.

In some embodiments, the weight ratio of a solution including the calcium salt and the metasilicate salt is 1:1.

In some embodiments, the solvent may include but is not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the solvent is ethanol. In some embodiments, the volume-by-volume (v/v) ratio of water to ethanol is in the range of 1:5 to 5:1, preferably 1:4 to 4:1, preferably 1:3 to 3:1, preferably 1:2 to 2:1, preferably 1:1. In a preferred embodiment, the v/v ratio of water to ethanol is 1:1.

In some embodiments, the method includes heating the solution to form a dry product of $CaSiO_3$ at a temperature of from about 150° C. to 250° C., preferably 155° C. to 245° C., preferably 160° C. to 240° C., preferably 165° C. to 235° C., preferably 170° C. to 230° C., and preferably 175° C. to 225° C. This step involves the chemical reaction and dehydration process that are necessary for converting the precursor materials into the desired solid product. The solution is preferably heated in an autoclave, optionally, other known heating appliances may be used as well. In some embodiments, the solution is heated for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solution is heated at 180° C. for 2 hours. The formation of $CaSiO_3$ in a furnace follows a precipitation and thermal reaction mechanism.

At step 74, the method 70 includes heating urea to form $g-C_3N_4$ product. In some embodiments, the precursor for $g-C_3N_4$ may include, but is not limited to, melamine, urea, dicyandiamide, cyanamide, thiourea, guanidine, ammonium thiocyanate, biguanide, and semicarbazide. In a preferred embodiment, the precursor used for synthesis of $g-C_3N_4$ is urea. When urea is heated in a crucible at 600° C., it undergoes thermal polymerization to form $g-C_3N_4$.

In some embodiments, urea is heated at a temperature of from about 500° C. to 700° C., preferably 510° C. to 690° C., preferably 520° C. to 680° C., preferably 530° C. to 670° C., preferably 540° C. to 660° C., preferably 550° C. to 650° C., preferably 560° C. to 640° C., preferably 570° C. to 630° C., preferably 580° C. to 620° C., and preferably 590° C. to 610° C. In a preferred embodiment, $g-C_3N_4$ is formed by heating urea in a closed vessel at a temperature of 600° C. for 45 min.

At step 76, the method 70 includes heating ammonium metavanadate with xylose in nitric acid to form vanadate product. In some embodiments, the mixture is heated at a temperature range of from 80 to 150° C., preferably 85° C. to 145° C., preferably 90° C. to 140° C., preferably 95° C. to 135° C., preferably 100° C. to 130° C., and preferably 105° C. to 125° C., for a duration in a range from 3 to 7 h, preferably 3.5 to 6.5 h, preferably 4.0 to 6.0 h, and preferably 4.5 to 4.5 to 5.5 h. In a preferred embodiment, the mixture is heated at a temperature of 120° C. for 5 h.

In some embodiments, the method of heating includes calcinating the solid product at a temperature of 450° C. to 700° C., preferably 460° C. to 690° C., preferably 470° C. to 680° C., preferably 480° C. to 670° C., preferably 490° C. to 660° C., preferably 500° C. to 650° C., preferably 510° C. to 640° C., preferably 520° C. to 630° C., preferably 530° C. to 620° C., and preferably 540° C. to 610° C. for 2 to 4 hours, preferably 2.2 to 3.8 h, preferably 2.4 to 3.6 h, preferably, 2.6 to 3.4 h, and preferably 2.8 to 3.2 h. In a preferred embodiment, the solid product is calcined at 550° C. for 3 h.

At step 78, the method 70 includes microwaving the silicate product, the g-$C_3N_4$ product, and the vanadate product in an organic solvent to form the $CaV_2O_6$@$CaSiO_3$@g-$C_3N_4$ nanocomposite. In some embodiments, the silicate product is calcium silicate ($CaSiO_3$), and the vanadate product is vanadium oxide ($V_2O_5$).

In some embodiments, the $CaSiO_3$, g-$C_3N_4$, and $V_2O_5$ are dispersed in a polar protic solvent and heating the dispersion at a temperature of from about 150° C. to 250° C., preferably 155° C. to 245° C., preferably 160° C. to 240° C., preferably 165° C. to 235° C., preferably 170° C. to 230° C., and preferably 175° C. to 225° C. at a pressure of from about 2.0 to 8.0 bar, preferably 2.5 to 7.5 bar, preferably 3.0 to 7.0 bar, preferably 3.5 to 6.5 bar, preferably 4.0 to 6.0 bar, and preferably 4.5 to 5.5 bar.

In some embodiments, polar protic solvent may include but are not limited to water, methanol, ethanol, propanol, isopropanol, butanol, isobutanol, sec-butanol, tert-butanol, pentanol, hexanol, heptanol, octanol, nonanol, decanol, formic acid, acetic acid, propionic acid, butyric acid, lactic acid, glycolic acid, glycerol, ethylene glycol, propylene glycol, diethylene glycol, triethylene glycol, 1,2-butanediol, 1,3-butanediol, 1,2-pentanediol, and 1,3-propanediol. In a preferred embodiment, the polar protic solvent is polyol.

In some embodiments, the polyol has a number average molecular weight 200 to about 300 mg KOH/g, preferably 200 to about 400 mg KOH/g, preferably 200 to about 500 mg KOH/g, preferably 200 to about 600 mg KOH/g, preferably 200 to about 700 mg KOH/g, preferably 200 to about 800 mg KOH/g, preferably 200 to about 900 mg KOH/g, preferably 200 to about 1000 mg KOH/g, preferably 200 to about 1100 mg KOH/g, preferably 200 to about 1200 mg KOH/g, preferably 200 to about 1300 mg KOH/g, 200 to about 1400 mg KOH/g, preferably 200 to about 1500 mg KOH/g, preferably 200 to about 1600 mg KOH/g, preferably 200 to about 1700 mg KOH/g, preferably 200 to about 1800 mg KOH/g, preferably 200 to about 1900 mg KOH/g, preferably 200 to about 2000 mg KOH/g, preferably 200 to about 2100 mg KOH/g, preferably 200 to about 2200 mg KOH/g, preferably 200 to about 2300 mg KOH/g, preferably 200 to about 2400 mg KOH/g, preferably 200 to about 2500 mg KOH/g, preferably 200 to about 2600 mg KOH/g, preferably 200 to about 2700 mg KOH/g, preferably 200 to about 2800 mg KOH/g, preferably 200 to about 2900 mg KOH/g, preferably 200 to about 3000 mg KOH/g, preferably 200 to about 3100 mg KOH/g, preferably 200 to about 3200 mg KOH/g, preferably 200 to about 3300 mg KOH/g, preferably 200 to about 3400 mg KOH/g, preferably 200 to about 3500 mg KOH/g, preferably 200 to about 3600 mg KOH/g, preferably 200 to about 3700 mg KOH/g, preferably 200 to about 3800 mg KOH/g, preferably 200 to about 3900 mg KOH/g, preferably 200 to about 4000 mg KOH/g, preferably 200 to about 4100 mg KOH/g, preferably 200 to about 4200 mg KOH/g, preferably 200 to about 4300 mg KOH/g, preferably 200 to about 4400 mg KOH/g, preferably 200 to about 4500 mg KOH/g, preferably 200 to about 4600 mg KOH/g, preferably 200 to about 4700 mg KOH/g, preferably 200 to about 4800 mg KOH/g, preferably 200 to about 4900 mg KOH/g, preferably 200 to about 4950 mg KOH/g, and an hydroxyl number preferably from 25 to about 35 mg KOH/g, preferably from 25 to about 40 mg KOH/g, preferably from 25 to about 50 mg KOH/g, preferably from 25 to about 55 mg KOH/g, preferably from 25 to about 60 mg KOH/g, preferably from 25 to about 65 mg KOH/g, preferably from 25 to about 70 mg KOH/g, preferably from 25 to about 75 mg KOH/g, preferably from 25 to about 80 mg KOH/g, preferably from 25 to about 85 mg KOH/g, preferably from 25 to about 90 mg KOH/g, preferably from 25 to about 95 mg KOH/g, preferably from 25 to about 100 mg KOH/g, preferably from 25 to about 105 mg KOH/g, preferably from 25 to about 110 mg KOH/g, preferably 25 to about 115 mg KOH/g, preferably 25 to about 120 mg KOH/g, preferably 25 to about 125 mg KOH/g, preferably 25 to about 130 mg KOH/g, preferably 25 to about 135 mg KOH/g, preferably 25 to about 140 mg KOH/g, preferably 25 to about 145 mg KOH/g, preferably 25 to about 150 mg KOH/g, preferably 25 to about 155 mg KOH/g, preferably 25 to about 160 mg KOH/g, preferably 25 to about 165 mg KOH/g, preferably 25 to about 170 mg KOH/g, preferably 25 to about 175 mg KOH/g, preferably 25 to about 180 mg KOH/g, preferably 25 to about 185 mg KOH/g, preferably 25 to about 190 mg KOH/g, preferably 25 to about 195 mg KOH/g, preferably 25 to about 200 mg KOH/g, preferably from 25 to about 205 mg KOH/g, preferably from 25 to about 210 mg KOH/g, preferably 25 to about 215 mg KOH/g, preferably 25 to about 220 mg KOH/g, preferably 25 to about 225 mg KOH/g, preferably 25 to about 230 mg KOH/g, preferably 25 to about 235 mg KOH/g, preferably 25 to about 240 mg KOH/g, preferably 25 to about 245 mg KOH/g, preferably 25 to about 250 mg KOH/g, preferably 25 to about 255 mg KOH/g, preferably 25 to about 260 mg KOH/g, preferably 25 to about 265 mg KOH/g, preferably 25 to about 270 mg KOH/g, preferably 25 to about 275 mg KOH/g, preferably 25 to about 280 mg KOH/g, preferably 25 to about 285 mg KOH/g, preferably 25 to about 290 mg KOH/g, preferably 25 to about 295 mg KOH/g, preferably 25 to about 300 mg KOH/g, preferably from 25 to about 305 mg KOH/g, preferably from 25 to about 310 mg KOH/g, preferably 25 to about 315 mg KOH/g, preferably 25 to about 320 mg KOH/g, preferably 25 to about 325 mg KOH/g, preferably 25 to about 330 mg KOH/g, preferably 25 to about 335 mg KOH/g, preferably 25 to about 340 mg KOH/g, preferably 25 to about 345 mg KOH/g, preferably 25 to about 350 mg KOH/g, preferably 25 to about 355 mg KOH/g, preferably 25 to about 360 mg KOH/g, preferably 25 to about 365 mg KOH/g, preferably 25 to about 370 mg KOH/g, preferably 25 to about 375 mg KOH/g, preferably 25 to about 380 mg KOH/g, preferably 4 to about 385 mg KOH/g, preferably 25 to about 390 mg KOH/g, preferably 25 to about 395 mg KOH/g, preferably 25 to about 400 mg KOH/g, preferably from 25 to about 405 mg KOH/g, preferably from 25 to about 410 mg KOH/g, preferably 25 to about 415 mg KOH/g, preferably 25 to about 420 mg KOH/g, preferably 25 to about 425 mg KOH/g, preferably 25 to about 430 mg KOH/g, preferably 25 to about 435 mg KOH/g, preferably 25 to about 440 mg KOH/g, preferably 25 to about 445 mg KOH/g, preferably 25 to about 450 mg KOH/g, preferably 25 to about 455 mg KOH/g, preferably 25 to about 460 mg KOH/g, preferably 25 to about 465 mg KOH/g, preferably 25 to about 470 mg KOH/g, preferably 25 to about 475 mg KOH/g, preferably 25 to about 480 mg KOH/g, preferably 25 to about 485 mg KOH/g, preferably 25 to about 490 mg KOH/g, and preferably 25 to about 495 mg KOH/g.

In some embodiments, the polyol is selected from the group consisting of: polyester polyols; polyether polyols; poly(ether-ester) polyols; poly(alkylene carbonate) polyols; and, mixtures thereof.

In some embodiments, the polyester polyols preferably include poly(ethylene glycol), poly(propylene glycol) and poly(tetrahydrofuran). The polyester polyols also include conventional polyester polyols, polycaprolactone polyols and polycarbonate diols, which contain ester groups or carbonate groups, and generally referred polyester polyols obtained by polycondensation of dicarboxylic acids with glycols and the like. The polyester polyols also include bio-based and eco-friendly polyester polyols.

In some embodiments, the polyether polyols preferably include Polyether Polyol (PPG), Polymeric Polyol (POP), Polytetramethylene ether glycol (PTMEG), specialty PPG polyols such as SAN grafted polyether polyol, EG "tipped" PPG polyols, poly(tetramethylene) glycol (PTMO), poly(propylene oxide) (PPO), poly(ethylene) glycol (PEG) or a mixture thereof.

In some embodiments, the polyester polyol includes poly(ether-co-ester) polyol, poly (ether-co-hydrocarbon) polyol, poly (ether-co-siloxane) polyol, poly (ester-co-siloxane) polyol, poly (ether-co-carbonate) polyol, poly (ester-co-carbonate) polyol, poly (ester-co-hydrocarbon) polyol, or mixtures thereof. In some embodiments, polycarbonate polyol include hydrocarbon polyol, polysiloxane polyol, poly(ether-co-ester) polyol, poly(ether-co-carbonate) polyol, poly(ether-co-hydrocarbon) polyol, poly(ether-co-siloxane) polyol, poly(ester-co-carbonate) polyol, poly(ester-co-hydrocarbon) polyol, poly(ester-co-siloxane) polyol, poly(carbonate-co-hydrocarbon) polyol, poly(carbonate-co-siloxane) polyol, poly(hydrocarbon-co-siloxane) polyol, or a mixture thereof.

In some embodiments, the polyester polyol is a poly(ether-ester) polyols preferably Polyether ester polyols are understood in accordance with the invention to mean those polyols having a chemical structure including both ether and ester groups. Examples of the polyether polyol include polyoxy (C2 to C3) alkylene polyols and polytetramethylene ether polyols.

In some embodiments, the polyester polyol is a poly(alkylene carbonate) polyols. The poly(alkylene carbonate) polyols included here can be prepared by reacting an oxirane with either carbon dioxide or a cyclic alkylene carbonate, or a mixture thereof in the presence of a suitable initiator. Suitable oxiranes include ethylene oxide, propylene oxide, butylene oxide, styrene oxide, and the like. Most preferred is ethylene oxide due to its relatively facile reaction with carbon dioxide and/or a cyclic alkylene carbonate.

In some embodiments, the polyol includes a polyoxy(C2-C3)alkylene polyol. More specific examples of the polyoxy (C2 to C3) alkylene polyol include polyoxyethylene polyols, polyoxypropylene polyols, and polyoxyethylene.polyoxypropylene (random and/or block) copolymers or any combinations thereof.

In alternate embodiments, the polyol further includes a polyoxy(C2-C3)alkylene polyol having a number average molecular weight of from about 200 to about 5000 g/mol. and an hydroxyl number of from about 25 to about 500 mg KOH/g.

In some embodiments, the polyoxy(C2-C3)alkylene polyol has a number average molecular weight 200 to about 300 mg KOH/g, preferably 200 to about 400 mg KOH/g, preferably 200 to about 500 mg KOH/g, preferably 200 to about 600 mg KOH/g, preferably 200 to about 700 mg KOH/g, preferably 200 to about 800 mg KOH/g, preferably 200 to about 900 mg KOH/g, preferably 200 to about 1000 mg KOH/g, preferably 200 to about 1100 mg KOH/g, preferably 200 to about 1200 mg KOH/g, preferably 200 to about 1300 mg KOH/g, 200 to about 1400 mg KOH/g, preferably 200 to about 1500 mg KOH/g, preferably 200 to about 1600 mg KOH/g, preferably 200 to about 1700 mg KOH/g, preferably 200 to about 1800 mg KOH/g, preferably 200 to about 1900 mg KOH/g, preferably 200 to about 2000 mg KOH/g, preferably 200 to about 2100 mg KOH/g, preferably 200 to about 2200 mg KOH/g, preferably 200 to about 2300 mg KOH/g, preferably 200 to about 2400 mg KOH/g, preferably 200 to about 2500 mg KOH/g, preferably 200 to about 2600 mg KOH/g, preferably 200 to about 2700 mg KOH/g, preferably 200 to about 2800 mg KOH/g, preferably 200 to about 2900 mg KOH/g, preferably 200 to about 3000 mg KOH/g, preferably 200 to about 3100 mg KOH/g, preferably 200 to about 3200 mg KOH/g, preferably 200 to about 3300 mg KOH/g, preferably 200 to about 3400 mg KOH/g, preferably 200 to about 3500 mg KOH/g, preferably 200 to about 3600 mg KOH/g, preferably 200 to about 3700 mg KOH/g, preferably 200 to about 3800 mg KOH/g, preferably 200 to about 3900 mg KOH/g, preferably 200 to about 4000 mg KOH/g, preferably 200 to about 4100 mg KOH/g, preferably 200 to about 4200 mg KOH/g, preferably 200 to about 4300 mg KOH/g, preferably 200 to about 4400 mg KOH/g, preferably 200 to about 4500 mg KOH/g, preferably 200 to about 4600 mg KOH/g, preferably 200 to about 4700 mg KOH/g, preferably 200 to about 4800 mg KOH/g, preferably 200 to about 4900 mg KOH/g, preferably 200 to about 4950 mg KOH/g, and an hydroxyl number preferably from 25 to about 35 mg KOH/g, preferably from 25 to about 40 mg KOH/g, preferably from 25 to about 50 mg KOH/g, preferably from 25 to about 55 mg KOH/g, preferably from 25 to about 60 mg KOH/g, preferably from 25 to about 65 mg KOH/g, preferably from 25 to about 70 mg KOH/g, preferably from 25 to about 75 mg KOH/g, preferably from 25 to about 80 mg KOH/g, preferably from 25 to about 85 mg KOH/g, preferably from 25 to about 90 mg KOH/g, preferably from 25 to about 95 mg KOH/g, preferably from 25 to about 100 mg KOH/g, preferably from 25 to about 105 mg KOH/g, preferably from 25 to about 110 mg KOH/g, preferably 25 to about 115 mg KOH/g, preferably 25 to about 120 mg KOH/g, preferably 25 to about 125 mg KOH/g, preferably 25 to about 130 mg KOH/g, preferably 25 to about 135 mg KOH/g, preferably 25 to about 140 mg KOH/g, preferably 25 to about 145 mg KOH/g, preferably 25 to about 150 mg KOH/g, preferably 25 to about 155 mg KOH/g, preferably 25 to about 160 mg KOH/g, preferably 25 to about 165 mg KOH/g, preferably 25 to about 170 mg KOH/g, preferably 25 to about 175 mg KOH/g, preferably 25 to about 180 mg KOH/g, preferably 25 to about 185 mg KOH/g, preferably 25 to about 190 mg KOH/g, preferably 25 to about 195 mg KOH/g, preferably 25 to about 200 mg KOH/g, preferably from 25 to about 205 mg KOH/g, preferably from 25 to about 210 mg KOH/g, preferably 25 to about 215 mg KOH/g, preferably 25 to about 220 mg KOH/g, preferably 25 to about 225 mg KOH/g, preferably 25 to about 230 mg KOH/g, preferably 25 to about 235 mg KOH/g, preferably 25 to about 240 mg KOH/g, preferably 25 to about 245 mg KOH/g, preferably 25 to about 250 mg KOH/g, preferably 25 to about 255 mg KOH/g, preferably 25 to about 260 mg KOH/g, preferably 25 to about 265 mg KOH/g, preferably 25 to about 270 mg KOH/g, preferably 25 to about 275 mg KOH/g, preferably 25 to about 280 mg KOH/g, preferably 25 to about 285 mg KOH/g, preferably 25 to about 290 mg KOH/g, preferably 25 to about 295 mg KOH/g, preferably 25 to about 300 mg KOH/g, preferably from 25 to about 305 mg KOH/g, preferably from 25 to about 310 mg KOH/g, preferably 25 to about 315 mg KOH/g, preferably 25 to about 320 mg KOH/g, preferably 25 to about 325 mg KOH/g, preferably 25 to about 330 mg KOH/g, preferably 25 to about 335 mg KOH/g, preferably 25 to about 340 mg KOH/g, preferably 25 to about 345 mg KOH/g, preferably 25 to about 350 mg KOH/g, preferably 25 to about 355 mg KOH/g, preferably 25 to about 360 mg KOH/g, preferably 25 to about 365 mg KOH/g, preferably 25 to about 370 mg KOH/g, preferably 25 to about 375 mg KOH/g, preferably 25 to about 380 mg KOH/g, preferably 4 to about 385 mg KOH/g, preferably 25 to about 390 mg KOH/g, preferably 25 to about 395 mg KOH/g, preferably 25 to about 400 mg KOH/g, preferably from 25 to about 405 mg KOH/g, preferably from 25 to about 410 mg KOH/g, preferably 25 to about 415 mg KOH/g, preferably 25 to about 420 mg KOH/g, preferably 25 to about 425 mg KOH/g, preferably 25 to about 430 mg KOH/g, preferably 25 to about 435 mg KOH/g, preferably 25 to about 440 mg KOH/g, preferably 25 to about 445 mg KOH/g, preferably 25 to about 450 mg KOH/g, preferably 25 to about 455 mg KOH/g, preferably 25 to about 460 mg KOH/g, preferably 25 to about 465 mg KOH/g, preferably 25 to about 470 mg KOH/g, preferably 25 to about 475 mg KOH/g, preferably 25 to about 480 mg KOH/g, preferably 25 to about 485 mg KOH/g, preferably 25 to about 490 mg KOH/g, and preferably 25 to about 495 mg KOH/g In a preferred embodiment, the polyol is mono $(C_1-C_4)$alkyl ethers of ethylene glycol. In a preferred embodiment, the polar protic solvent is ethylene glycol monomethyl ether.

In some embodiments, the dispersion is further heated at a temperature of from about 150 to about 250° C. at a pressure of from about 3 to 6 bar, preferably 3.2 to 5.8 h, preferably 3.4 to 5.6 h, preferably 3.6 to 5.4 h, and preferably 3.8 to 5.2 h. In a preferred embodiment, the $CaSiO_3$, g-$C_3N_4$, and $V_2O_5$ are dispersed in ethylene glycol monoethyl ether, and the dispersion is heated at a temperature of about 180° C. at a pressure of about 5 bar.

In some embodiments, the method further includes separating the solid nanocomposite from the heated dispersion. In some embodiments, the solid nanocomposite from the heated dispersion is separated by distinct methods, which may include, but are not limited to, gravity filtration, centrifugation, hot filtration, cold filtration, granular media filtration, mechanical filtration, multilayer filtration, and vacuum filtration. In a preferred embodiment, solid nanocomposite from the heated dispersion is separated by vacuum filtration using the Buchner system. The water may be tap water, distilled water, bidistilled water, deionized water, deionized distilled water, reverse osmosis water, and/or some other water. In a preferred embodiment, the water is distilled water for rinsing in the Buchner system.

EXAMPLES

The following examples demonstrate hydrogen gas generation using a graphite-phase carbon nitride, calcium metavanadate, and calcium silicate ($CaV_2O_6$@$CaSiO_3$@g-$C_3N_4$) nanocomposite. The examples are provided solely for illustration and are not to be construed as limitations of the present disclosure, as many variations thereof are possible without departing from the spirit and scope of the present disclosure.

Example 1: Fabricating the Calcium Silicate ($CaSiO_3$)

Equal moles of calcium nitrate ($Ca(NO_3)_2$) and sodium metasilicate ($Na_2SiO_3$) were dispersed in 100 milliliters (mL) of ethanol: water (1:1) in a 150 mL glass beaker and sonicated for 15 minutes (min). The mixture was transferred to a 200 mL autoclave and then placed in an oven operated at 180 degrees Celsius (° C.) for 2.0 hours (h). The product was dispersed in 500 mL distilled water with an ultrasonic bath for 10 min, filtered via a Buchner system, rinsed with distilled water, and dried at 120° C. for 1.0 h.

Example 2: Fabricating the Graphitic-Phase Carbon Nitride (g-$C_3N_4$)

About 30.0 grams (g) of urea was placed in a 250 mL porcelain crucible, covered with its porcelain cover, then the hall crucible and cover were wrapped with three layers of aluminum foil to reduce the urea loss of evaporation. The crucible was heated via a furnace set at 600° C. for 45 min.

Example 3: Fabricating the Vanadium Oxide ($V_2O_5$)

About 10.0 ammonium metavanadate ($NH_4VO_3$) and 10.0 g of xylose were placed in a 500 mL beaker. 100 mL of distilled water was added to the mixture and heated till a clear solution was obtained. 10 mL of concentrated nitric acid was added to the mixture, which was then heated till the carbonization of xylose. The mixture was placed in an oven set at 120° C. for 5.0 h; the black product was milled in a mortar, placed in a 150 mL porcelain dish, and calcined at 550° C. for 3.0 h.

Example 4: Fabricating the $CaV_2O_6$@$CaSiO_3$@g-$C_3N_4$

An equal mass of $CaSiO_3$, g-$C_3N_4$, and $V_2O_5$ was transferred to a mono wave-200 vial (G30), dispersed in 20 mL ethylene glycol monomethyl ether via an ultrasonic bath for 30 min. The vial was closed with its Teflon cover and placed in the Anton-Baar Monowave-200 operated at 180° C. and 5.0 bar pressure for one hour. The product was dispersed in 1 liter (L) of distilled water with an ultrasonic bath for 30 minutes, filtered via a Buchner system, rinsed with distilled water, and dried at 150° C. for 2.0 h.

Figure 2:
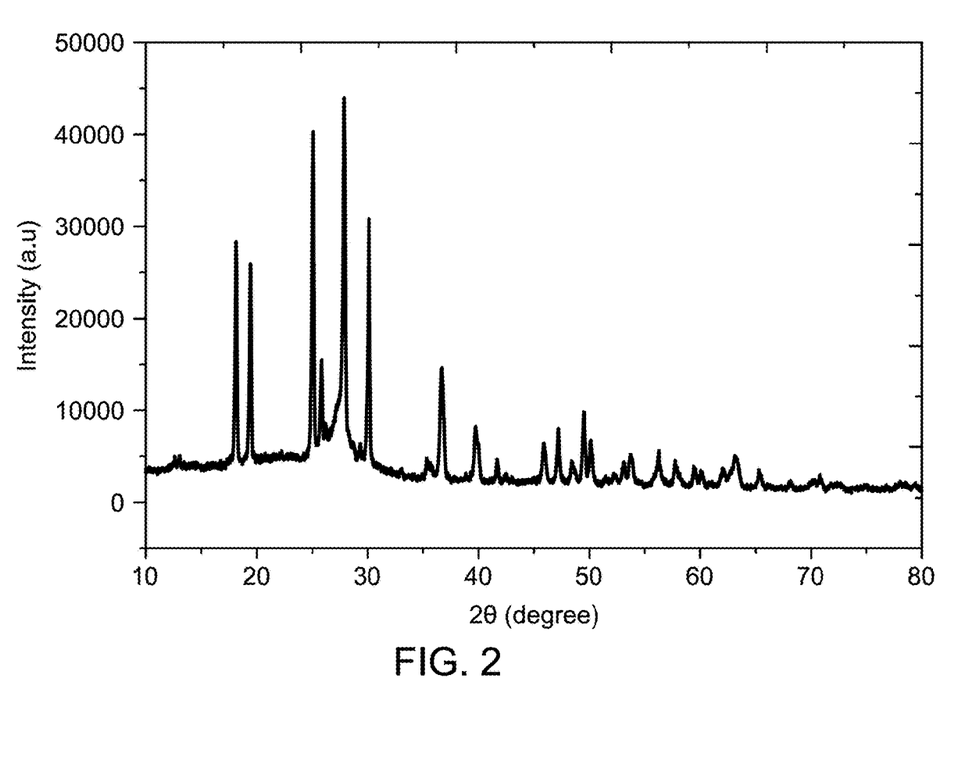
FIG. 2 shows a graph depicting X-ray diffraction (XRD) pattern of the $CaV_2O_6@CaSiO_3@g-C_3N_4$ nanocomposite, according to certain embodiments.
Figure 3A:
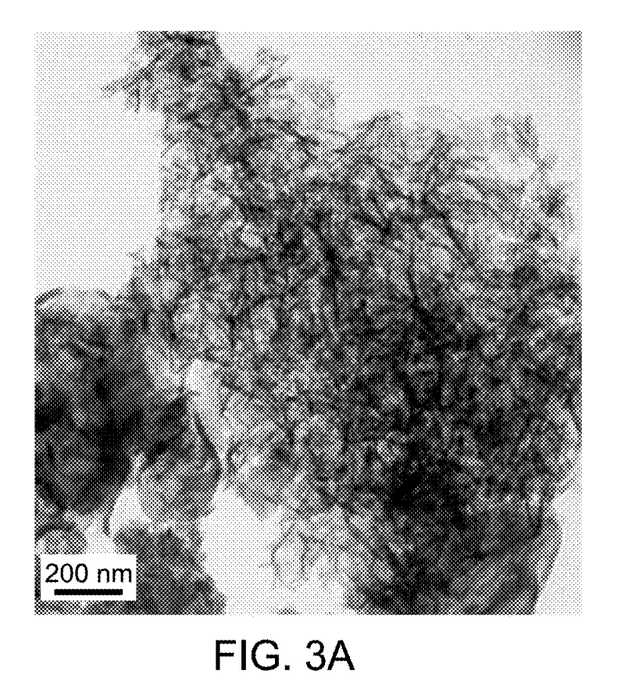
FIG. 3A shows a transmission electron microscopy (TEM) image of the $CaV_2O_6@CaSiO_3@g-C_3N_4$ nanocomposite at 200 nanometers (nm) scale, according to certain embodiments.
Figure 3B:
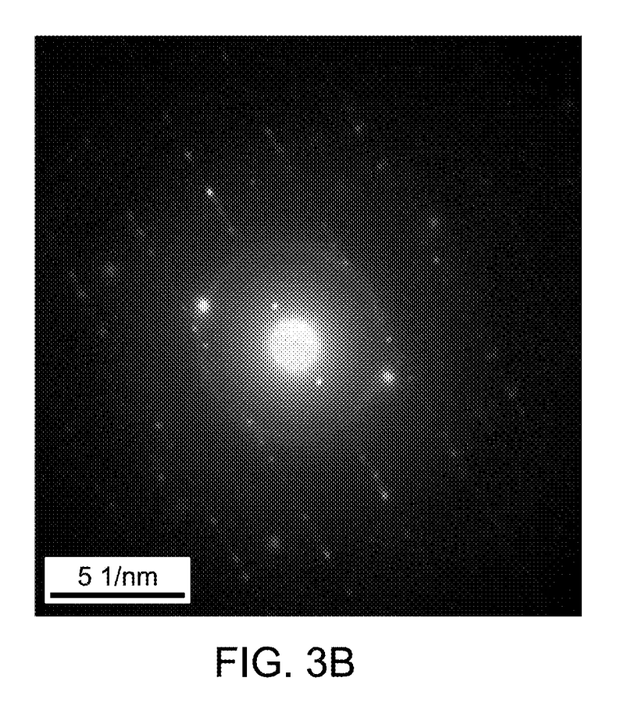
FIG. 3B shows a selected area electron diffraction (SAED) pattern of the $CaV_2O_6@CaSiO_3@g-C_3N_4$ nanocomposite, according to certain embodiments.
Figure 4A:
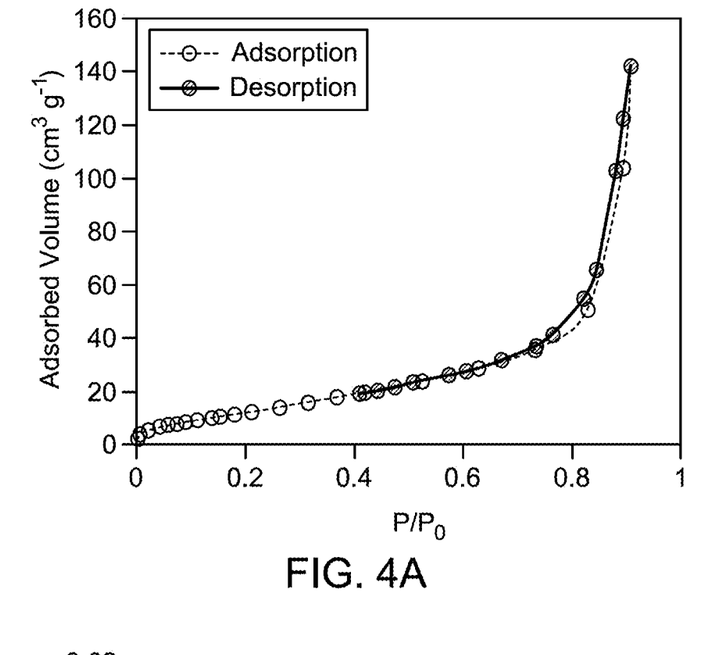
FIG. 4A shows a graph depicting adsorption-desorption isotherms of the $CaV_2O_6@CaSiO_3@g-C_3N_4$ nanocomposite, according to certain embodiments.
Figure 4B:
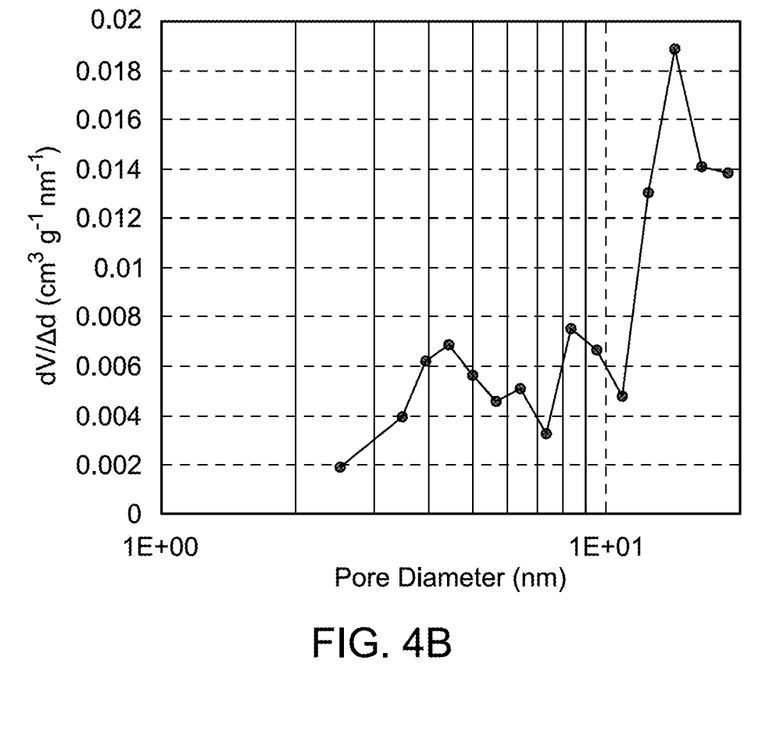
FIG. 4B shows a graph depicting the pore size distribution of the $CaV_2O_6@CaSiO_3@g-C_3N_4$ nanocomposite, according to certain embodiments.

The crystallinity and phases identification present in the $CaSiO_3$@$V_2O_5$@g-$C_3N_4$ catalyst was analyzed by X-ray diffraction (XRD) and the results are given in FIG. 2. The intense peaks and high intensity values indicate that the powder is highly crystalline in nature. Examination of the diffraction patterns with the standard PDF cards reveals the presence of $CaV_2O_6$ as major phase together with $CaSiO_3$, and g-$C_3N_4$ as minor phases. The $CaV_2O_6$ phase was indexed to the 2θ values of 25.1°, 25.9°, 27.8°, 27.9°, 30.10, 36.8°, 36.9°, 39.7°, and 49.6°. These diffractions are, respectively, assigned to (201), (100), (−202), (−111), (111), (−311), (400), (003) and (020) plans of the monoclinic phase of $CaV_2O_6$ (Reference code No. 01-073-0186). The $CaSiO_3$ phase (COD No. 01-072-2284) was detected at 2θ values of 25.2°, 30.2°, and 41.8°. These diffractions were respectively coming from (002), (120), and (−231). The diffractions related to g-$C_3N_4$ were observed at 45.8°, 53.7°, 71.8°, and 79.4° (COD No. 1534042). Minor traces of $SiO_2$ were detected at 2θ values of 19.3° and 25.10 (Reference code No. 00-049-0629). No other phases were detected, indicating the successful fabrication of $CaV_2O_6$@$CaSiO_3$@g-$C_3N_4$. TEM images of $CaV_2O_6$@$CaSiO_3$@g-$C_3N_4$ nanocomposite were presented in FIG. 3. The transmission electron microscopy (TEM) images showed a two-dimensional porous structure constructed with curled and wrinkled nanosheets and platelets of the g-$C_3N_4$ (FIG. 3A). The image also shows a dispersion of homogeneous nanowires of metal oxides with an average length of 90.6 nanometers (nm) on nanosheets of g-$C_3N_4$. The corresponding selected area electron diffraction (SAED) pattern, as shown in FIG. 3B, reveals diffraction spots with interplanar spacing of 0.23 nm, 0.219 nm, 0.17 nm, and 0.146 nm due to (003, $CaV_2O_6$, (−231, $CaSiO_3$) and (003, $CaV_2O_6$), diffraction planes, respectively as confirmed from XRD data. FIG. 4A-B displays the nitrogen adsorption-desorption isotherms of $CaV_2O_6$@$CaSiO_3$@g-$C_3N_4$ nanocomposite. The nitrogen sorption isotherm of the composite belongs to type IV with a narrow hysteresis loop, indicating the formation of mesoporous structures. However, shifting the loop to a relatively higher pressure (P/$P_0$=0.73-1) indicates that the presence of wide mesopores may result from the deposition of metal oxide particles in the wide pores of g-$C_3N_4$. Furthermore, the Brunauer-Emmett-Teller (BET) surface area of the $CaV_2O_6$@$CaSiO_3$@g-$C_3N_4$ sample was calculated to be 57.02 meters square per gram ($m^2g^{-1}$). The marked high specific surface area reflects the good dispersion of these metal oxide nanoparticles on g-$C_3N_4$ and $CaSiO_3$. Moreover, the pore size distribution curves, plotted using the Barrett-Joyner-Halenda (BJH) method, for the $CaV_2O_6$@$CaSiO_3$@g-$C_3N_4$ sample exhibited trimodal distribution with average pore diameters maximized at 4.3 nm, 8.5 nm, and 14.27 nm and pore volume of 0.22 cubic centimeters per gram ($cm^3g^{-1}$). All the isotherms belong to the category H3 type of pores, which do not exhibit limiting adsorption at high P/$P_0$ and arise due to aggregation of plate-like particles, giving rise to slit-shaped pores indicating that the $CaV_2O_6$@$CaSiO_3$@g-$C_3N_4$ composite assembly provoked a mesoporous array.

Figure 5:
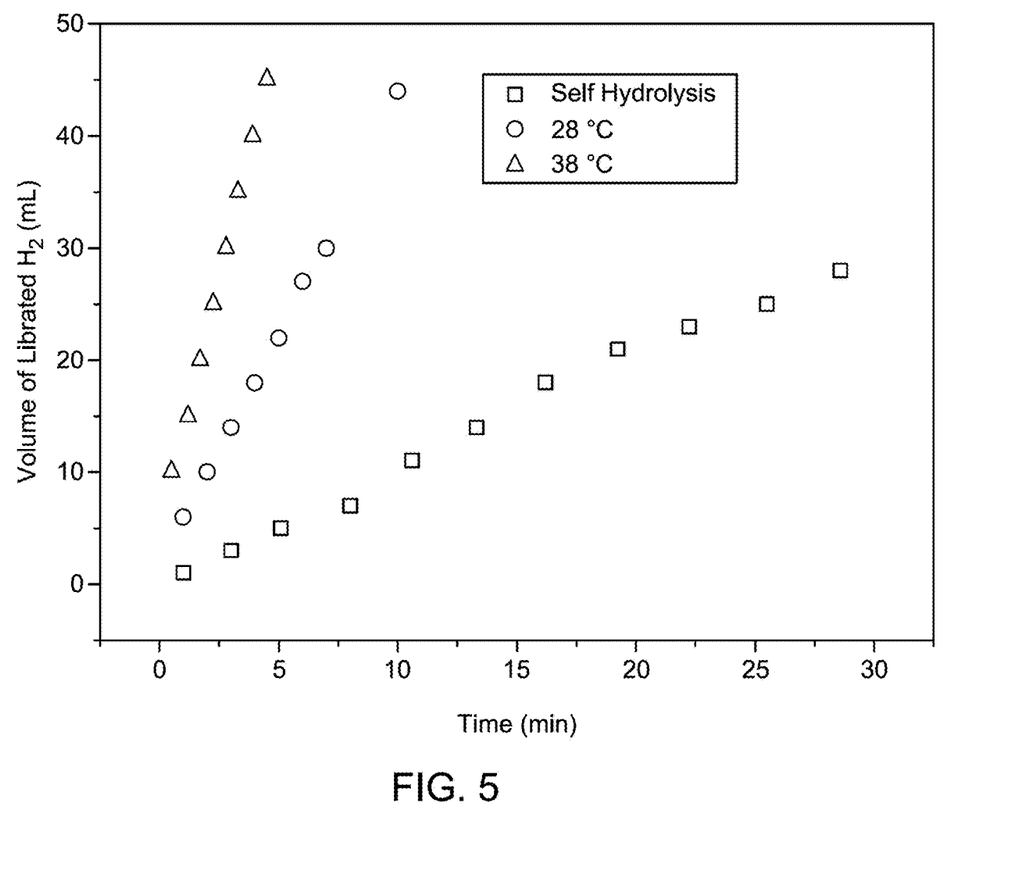
FIG. 5 shows a graph depicting variation of volume of liberated hydrogen with reaction time over the $CaV_2O_6@CaSiO_3@g-C_3N_4$ nanocomposite, according to certain embodiments.

The results of hydrolysis of $NaBH_4$ with and without $CaV_2O_6$@$CaSiO_3$@g-$C_3N_4$ catalyst are shown in FIG. 5. The catalytic action of the $CaV_2O_6$@$CaSiO_3$@g-$C_3N_4$ was observed where the catalytic reaction exhibited catalytic activity higher than the self-hydrolysis process. According to the data analysis, hydrogen gas volume rises gradually over time. In addition, the catalytic hydrolysis reaction increases with the increase in reaction temperature. Results demonstrate that on using 0.7 g of NaBH4, values of HGR of 367.5 milliliters per minute per gram (mLmin$^{-1}$g$^{-1}$) and 2312.5 mLmin$^{-1}$g$^{-1}$ were obtained at reaction temperatures of 28° C. and 38° C., respectively.

Numerous modifications and variations of the present disclosure are possible in light of the above teachings. It is therefore to be understood that within the scope of the appended claims, the invention may be practiced otherwise than as specifically described herein.

The invention claimed is:

1. A method for hydrogen generation, comprising:
   contacting a graphite-phase carbon nitride calcium metavanadate and calcium silicate ($CaV_2O_6$@$CaSiO_3$@g-$C_3N_4$) nanocomposite with sodium borohydride in water; and
   hydrolyzing the sodium borohydride to generate hydrogen.

2. The method of claim 1, wherein the sodium borohydride is present in an amount of 0.5 to 1 grams (g) per 0.4 milligram (mg) of the $CaV_2O_6$@$CaSiO_3$@g-$C_3N_4$ nanocomposite.

3. The method of claim 1, wherein the $CaV_2O_6$@$CaSiO_3$@g-$C_3N_4$ nanocomposite is present in an amount of 3.5 to 4.5 mg per 700 mg of the borohydride.

4. The method of claim 1, wherein the contacting occurs at a temperature of 20 to 45 degrees Celsius (° C.).

5. The method of claim 1, wherein the hydrogen is generated at a hydrogen generation rate of 2200 to 2400 milliliters per minute (mL/min) per gram of $CaV_2O_6$@$CaSiO_3$@g-$C_3N_4$ nanocomposite at a temperature of 35° to 40° C.

6. The method of claim 1, wherein the hydrolyzing generates at least 10 mL hydrogen within 2 minutes at a temperature of 35° to 40° C.

7. The method of claim 1, wherein the hydrolyzing generates at least 30 mL hydrogen within 3 minutes at a temperature of 35° to 40° C.

8. The method of claim 1, wherein the hydrolyzing generates at least 45 mL hydrogen within 5 minutes at a temperature of 35° to 40° C.

9. The method of claim 1, wherein the hydrogen is generated at a hydrogen generation rate of 300 to 400 mL/min per gram of $CaV_2O_6$@$CaSiO_3$@g-$C_3N_4$ nanocomposite at a temperature of 25° to 30° C.

10. The method of claim 1, wherein the hydrolyzing generates at least 5 mL hydrogen within 2 minutes at a temperature of 25° to 30° C.

11. The method of claim 1, wherein the hydrolyzing generates at least 21 mL hydrogen within 5 minutes at a temperature of 25° to 30° C.

12. The method of claim 1, wherein the hydrolyzing generates at least 43 mL hydrogen within 10 minutes at a temperature of 25° to 30° C.

13. The method of claim 1, wherein the hydrolyzing at a temperature of 35° to 40° C. has a hydrogen generation rate that is 8 to 11 times faster than the hydrolyzing without contacting with the $CaV_2O_6$@$CaSiO_3$@g-$C_3N_4$ nanocomposite.

14. The method of claim 1, wherein the hydrolyzing at a temperature of 25° to 30° C. has a hydrogen generation rate that is 4 to 6 times faster than the hydrolyzing without contacting with the $CaV_2O_6$@$CaSiO_3$@g-$C_3N_4$ nanocomposite.

15. The method of claim 1, wherein the $CaV_2O_6$@$CaSiO_3$@g-$C_3N_4$ nanocomposite comprises a graphite-phase carbon nitride (g-$C_3N_4$) in an amount of 20 to 40 percent by weight (wt. %), calcium silicate ($CaSiO_3$) in an amount of 20 to 40 wt. %, and calcium metavanadate ($CaV_2O_6$) in an amount of 20 to 40 wt. %, based on a total weight of the $CaV_2O_6$/$CaSiO_3$/g-$C_3N_4$ nanocomposite.

16. The method of claim 1, wherein the $CaV_2O_6$@$CaSiO_3$@g-$C_3N_4$ nanocomposite is porous, and has an average pore diameter of 2 to 16 nanometers (nm).

17. The method of claim 1, wherein the $CaV_2O_6$@$CaSiO_3$@g-$C_3N_4$ nanocomposite is porous, and has a pore volume to 0.2 to 0.24 cubic centimeters per gram ($cm^3g^{-1}$).

18. The method of claim 1, wherein the $CaV_2O_6$@$CaSiO_3$@g-$C_3N_4$ nanocomposite comprises:
   a major $CaV_2O_6$ phase;
   a major $CaSiO_3$ phase; and
   a minor g-$C_3N_4$ phase,
      wherein the $CaV_2O_6$ phase and the $CaSiO_3$ phase are in a structure of nanowires, and the g-C$_3$N$_4$ phase is in a structure of nanosheets,
wherein the nanowires are dispersed in between the nanosheets.

19. The method of claim 1, wherein the CaV$_2$O$_6$@CaSiO$_3$@g-C$_3$N$_4$ nanocomposite has g-C$_3$N$_4$ nanosheets with an interplanar spacing of 0.13 to 0.25 nanometers (nm).

20. The method of claim 1, wherein the CaV$_2$O$_6$@CaSiO$_3$@g-C$_3$N$_4$ nanocomposite is produced in a process, comprising:
   mixing a calcium salt and a metasilicate salt in a solvent to form a silicate product;
   heating urea to form g-C$_3$N$_4$ product;
   heating ammonium metavanadate with xylose in nitric acid to form vanadate product;
   microwaving the silicate product, the g-C$_3$N$_4$ product, and the vanadate product in an organic solvent to form the CaV$_2$O$_6$@CaSiO$_3$@g-C$_3$N$_4$ nanocomposite.

* * * * *